US012628985B2

(12) United States Patent
Shi

(10) Patent No.: US 12,628,985 B2
(45) Date of Patent: May 19, 2026

(54) MULTI-FUNCTIONAL GRILL

(71) Applicant: NANJING MINGYUE Electronic Technology Co Ltd, Nanjing (CN)

(72) Inventor: Tingqin Shi, Nanjing (CN)

( * ) Notice: Subject to any disclaimer, the term of this patent is extended or adjusted under 35 U.S.C. 154(b) by 395 days.

(21) Appl. No.: 18/337,837

(22) Filed: Jun. 20, 2023

(65) Prior Publication Data

US 2024/0285122 A1 Aug. 29, 2024

(30) Foreign Application Priority Data

Feb. 28, 2023 (CN) .......................... 202320333559.0

(51) Int. Cl.
*A47J 37/07* (2006.01)

(52) U.S. Cl.
CPC ....... *A47J 37/0704* (2013.01); *A47J 37/0763* (2013.01)

(58) Field of Classification Search
CPC ................ A47J 37/0763; A47J 37/0704; A47J 2037/0777
See application file for complete search history.

(56) References Cited

U.S. PATENT DOCUMENTS

| | | | | |
|---|---|---|---|---|
| 1,250,861 | A | * 12/1917 | Hackney | A47J 37/0763 126/9 R |
| 4,885,988 | A | * 12/1989 | Lee | A47J 37/0704 99/449 |
| 5,996,572 | A | * 12/1999 | Ilagan | A47J 37/0786 126/30 |
| 2007/0089724 | A1 | * 4/2007 | Home | A47J 37/0704 126/9 R |
| 2010/0206287 | A1 | * 8/2010 | McLemore | A47J 37/0731 126/1 R |
| 2011/0271949 | A1 | * 11/2011 | Ortner | A47J 37/0704 126/25 R |
| 2014/0224240 | A1 | * 8/2014 | Chung | A47J 37/0704 126/25 R |
| 2019/0254478 | A1 | * 8/2019 | Ries | A47J 37/0786 |
| 2024/0374083 | A1 | * 11/2024 | Després | A47J 37/0704 |

* cited by examiner

*Primary Examiner* — Alfred Basichas

(57) ABSTRACT

A multi-functional grill comprises a supporting frame, stiffeners, wire mesh storage, grill main body, ashtray, supporting legs, wheels, side tables, top cover, chimney, rotating cap, charcoal doors, handles, rotating handles, barbecue grid, charcoal tray, U-shaped handle, thermometer, air vents, slider, fixation hook, fixed axis, warming rack. The invention has the following advantages compared to the prior art: the multiple storage locations allow grilled food to be placed directly for display, which is suitable for both civil and commercial use; the grill with a cover allows the heat gathering with increased convenience, and the foldable side tables reduce the space occupation for placement.

3 Claims, 6 Drawing Sheets

19

MULTI-FUNCTIONAL GRILL

1. TECHNICAL FIELD

The invention relates to the field of outdoor grilling appliances, in particular to a multi-functional grill.

2. BACKGROUND ART

The grill is a kind of barbecue equipment for grilled lamb shashlik, grilled meat, grilled vegetables and other grilled food, and the essence of the grill is to heat and cook food through the heat source. Traditional grills with simpler structures generally adopt the open-type grills. However, the application of the existing technology has difficulty in gathering heat with low economy and environmental protection, which prevents small-scale grilling and precise control of the grilling fire, thus a multi-functional grill with wider application is urgent to be explored.

3. SUMMARY OF THE INVENTION

The technical problem to be solved by the invention is to provide a multi-functional grill for the above problem in the prior arts.

To solve the above technical problems, the invention provides technical solutions as follows: a multi-functional grill comprising a supporting frame, wherein the supporting frame is provided with stiffeners at the bottom, and a wire mesh storage is provided between the stiffeners; the supporting frame is provided with a grill main body at the top, and the grill main body is provided with an ashtray at the bottom; the grill main body is provided with supporting legs on the bottom of one side of the supporting frame and wheels on the other side; the supporting frame is provided with side tables on the top, and the side tables are provided on both sides of the grill main body; the top of the grill main body is hinged with the top cover, and the top cover is provided with a chimney; the top of the chimney is hinged with a rotating cap, the side of the grill main body is hinged with charcoal doors, and the charcoal doors are provided with handles; there are two charcoal doors with the axisymmetric arrangement, and rotating handles are provided on both sides of the charcoal doors; the grill main body is provided inside with a barbecue grid with a charcoal tray at the bottom of the barbecue grid, and the charcoal tray is matched with the rotating handle; the top cover is provided with a U-shaped handle, a thermometer is provided on the top of the U-shaped handle, and the side of the grill main body is provided with air vents.

Further, there are two charcoal doors with the axisymmetric arrangement, and the symmetrically provided charcoal doors allow for adding charcoal on the one side according to actual usage requirement.

Further, the side tables are connected to the supporting frame with a slider, and the slider is provided with a fixation hook; the top of the supporting frame is provided with a fixed axis, and the fixation hook is connected in conjunction with the fixed axis. The above structure allows the side tables and supporting frame to be placed in close proximity when not in use, to reduce the space occupation.

Further, the side tables are provided with square steel tubes on both sides and multiple sheet plates on the top, with sheet plates and the square steel tubes perpendicular to each other. The sheet plates are in the shape of rectangular, to improve the storage area.

Further, the warming rack is provided between the top cover and the grill main body. The warming rack is designed as the foldable barbecue grid, the Z-shaped structure with hinge joint can achieve the full expansion when opening the top cover.

Compared to the prior arts, the invention has the following advantages and beneficial effects: the multiple storage locations allow grilled food to be placed directly for display, which is suitable for both civil and commercial use; the grill with a cover allows maximum heat gathering and preservation of the grill to provide warming for the grilled food with increased convenience, and the foldable side tables reduce the space occupation for placement.

4. BRIEF DESCRIPTION OF ACCOMPANY DRAWINGS

Figure 1:
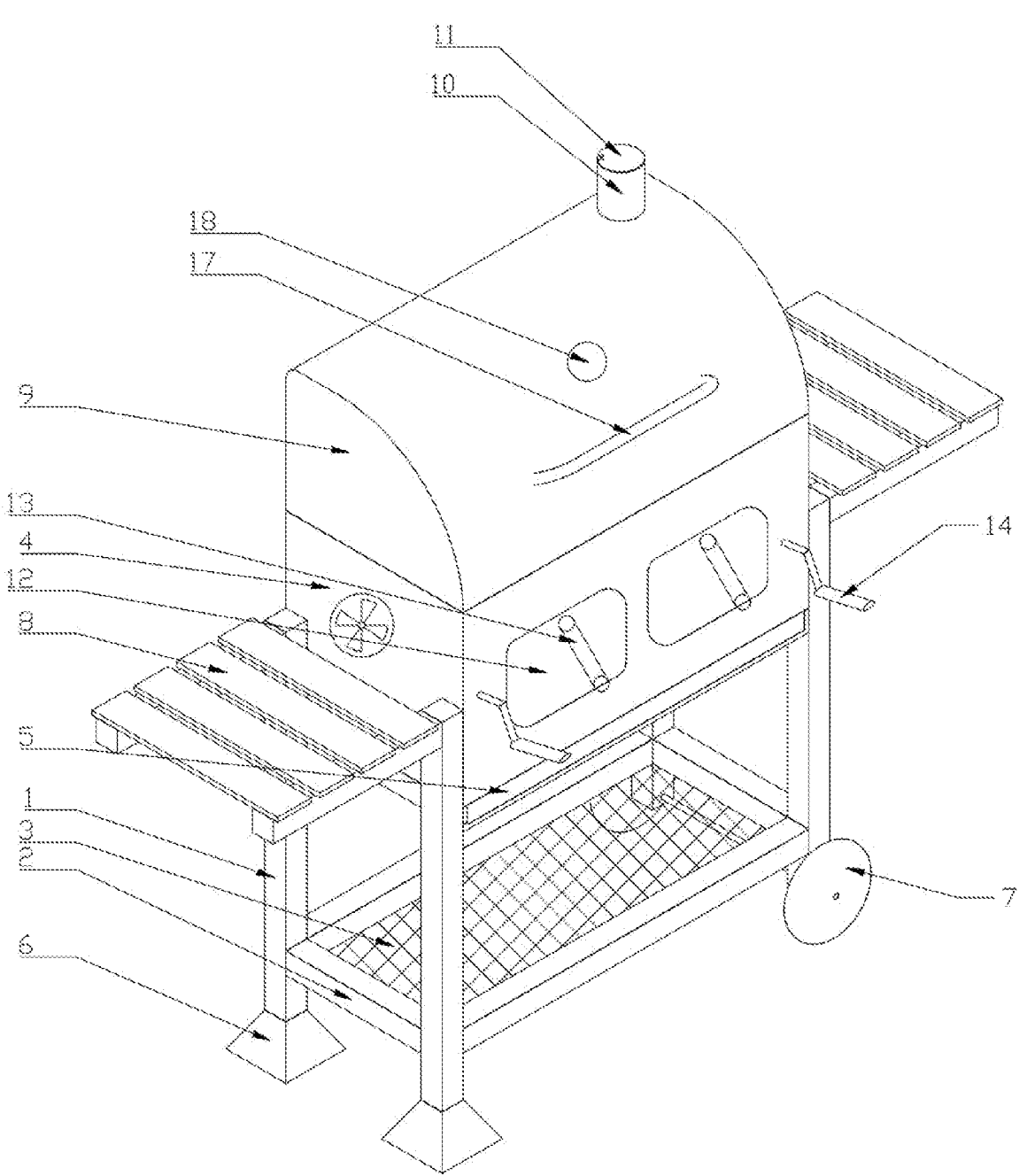
FIG. 1 is a schematic diagram showing the structure of a multi-functional grill.
Figure 2:
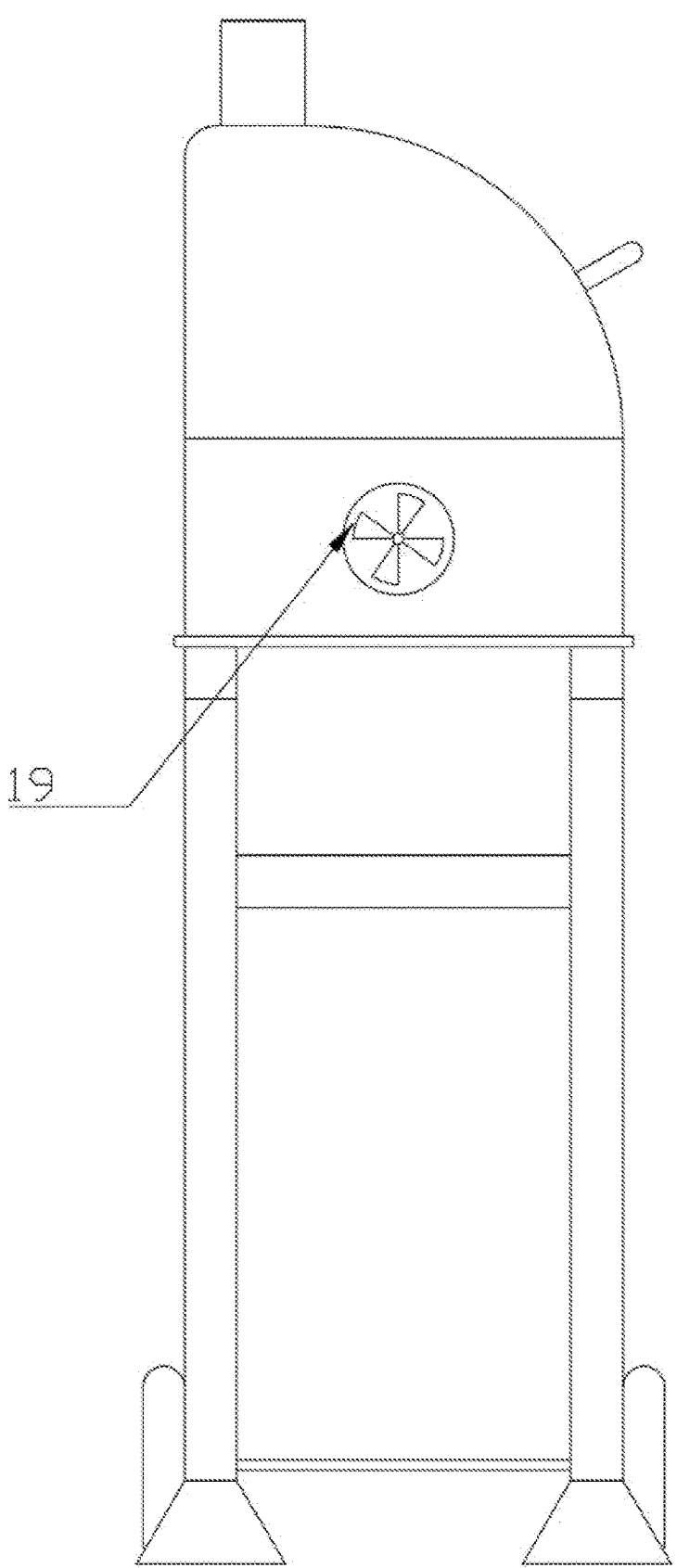
FIG. 2 is a schematic diagram showing the side view of a multi-functional grill.
Figure 3:
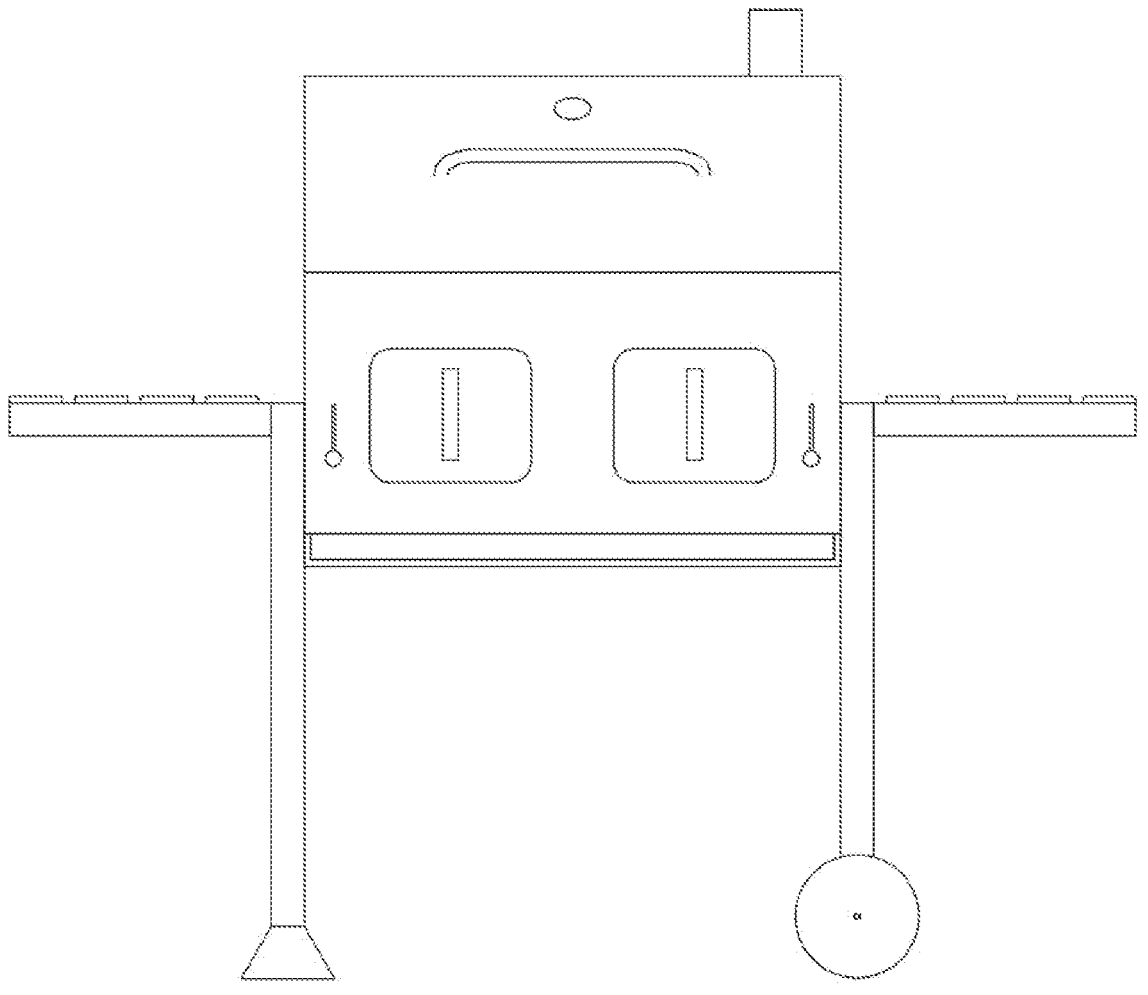
FIG. 3 is a schematic diagram showing the main view of a multi-functional grill.
Figure 4:
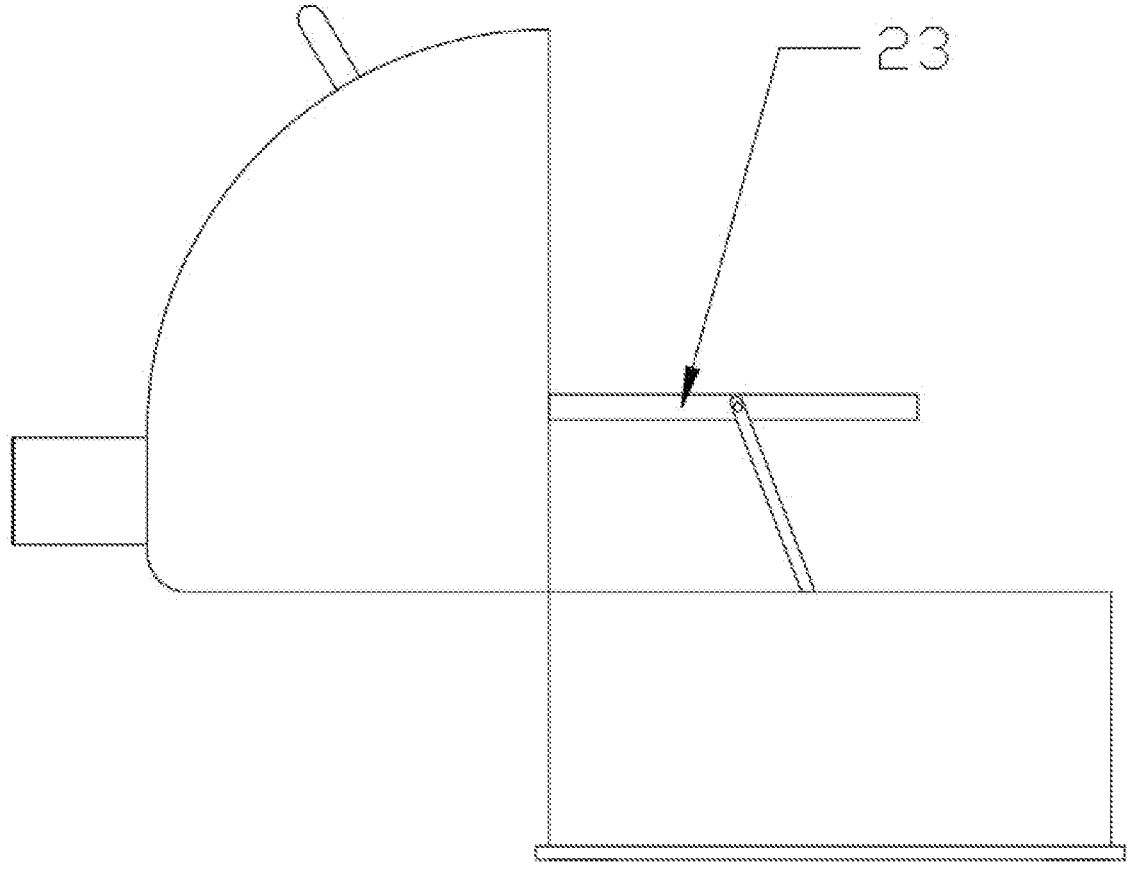
FIG. 4 is a schematic diagram showing the structure of warming rack provided by the multi-functional grill.
Figure 5:
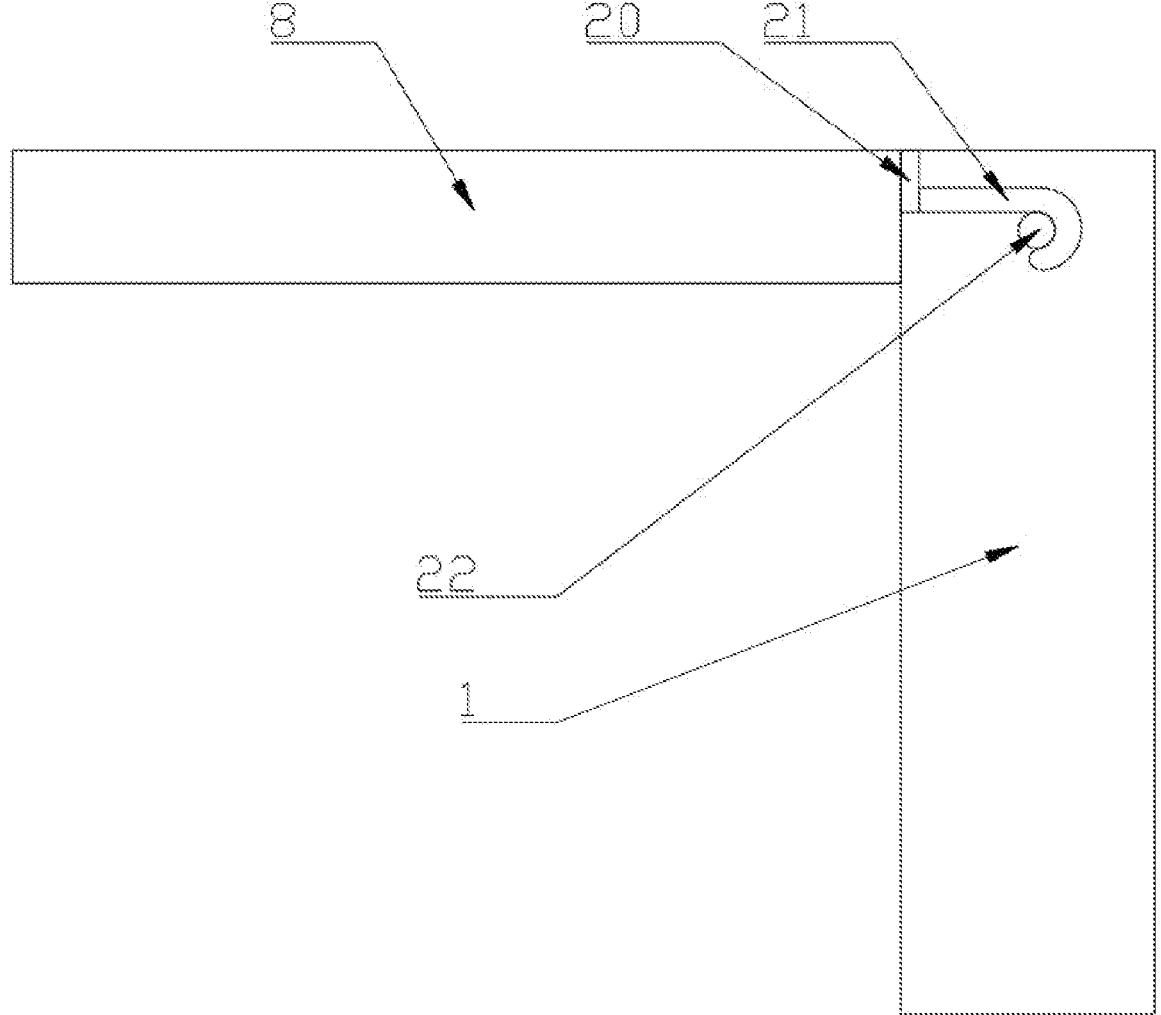
FIG. 5 is a schematic diagram showing the side tables provided by the multi-functional grill.
Figure 6:
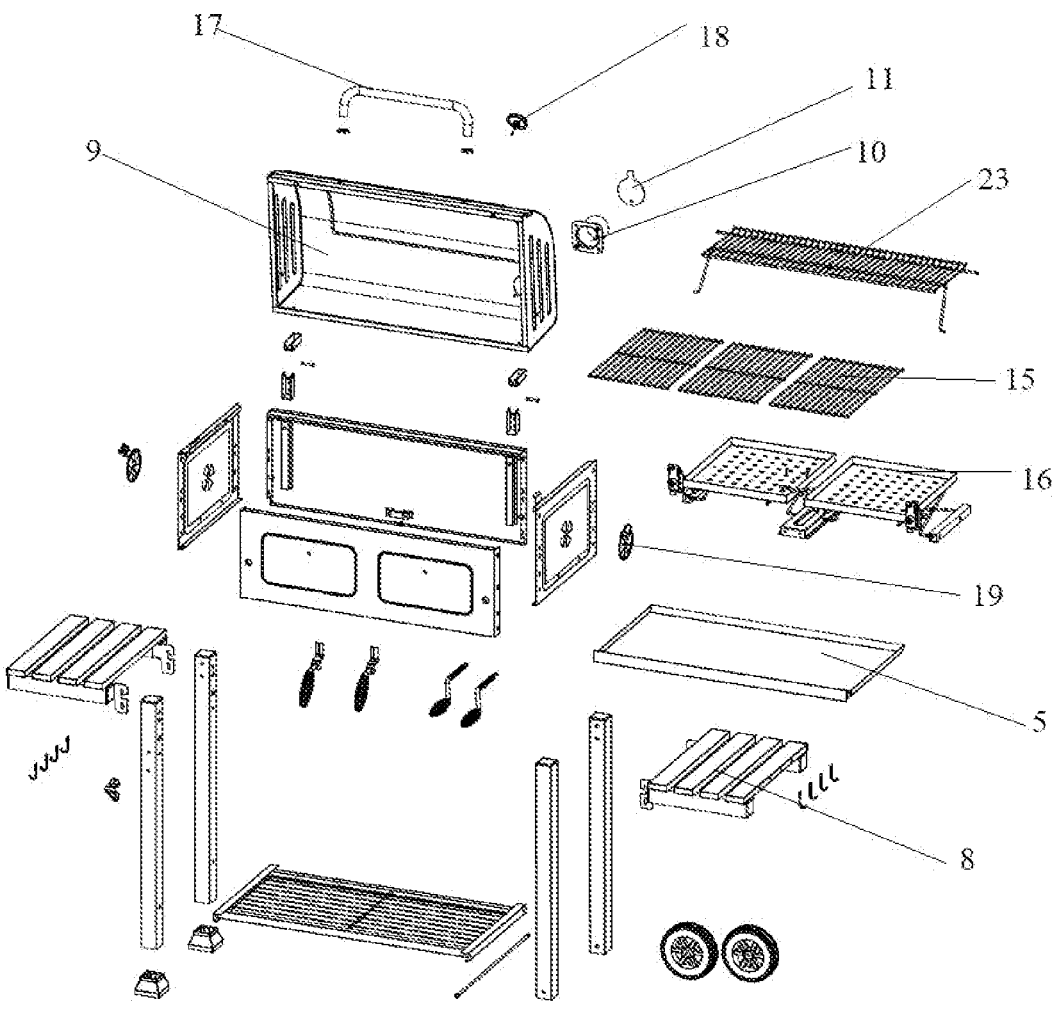
FIG. 6 is a schematic diagram showing the exploded view of parts of a multi-functional grill.

In the figures, 1. the supporting frame; 2. the stiffeners; 3. the wire mesh storage; 4. the grill main body; 5. the ashtray; 6. the supporting legs; 7. the wheels; 8. the side tables; 9. the top cover; 10. the chimney; 11. the rotating cap; 12. the charcoal doors; 13. the handles; 14. the rotating handles; 15. the barbecue grid; 16. the charcoal tray; 17. the U-shaped handle; 18. the thermometer; 19. the air vents; 20. the slider; 21. the fixation hook; 22. the fixed axis; 23. the warming rack.

5. SPECIFIC EMBODIMENT OF THE INVENTION

To make the technical solutions provided by the invention more comprehensible, exemplary embodiments according to the application are described below in detail with reference to the accompanying drawings.

In the specific implementation of the invention, a multi-functional grill comprising a supporting frame 1, wherein the supporting frame 1 is provided with stiffeners 2 at the bottom, and a wire mesh storage 3 is provided between the stiffeners 2; the supporting frame 1 is provided with a grill main body 4 at the top, and the grill main body 4 is provided with an ashtray 5 at the bottom; the grill main body 4 is provided with supporting legs 6 on the bottom of one side of the supporting frame 1 and wheels 7 on the other side; the supporting frame 1 is provided with side tables 8 on the top, and the side tables 8 are provided on both sides of the grill main body 4; the top of the grill main body 4 is hinged with the top cover 9, and the top cover 9 is provided with a chimney 10; the top of the chimney 10 is hinged with a rotating cap 11, the side of the grill main body 4 is hinged with charcoal doors 12, and the charcoal doors 12 are provided with handles 13; there are two charcoal doors 12 with the axisymmetric arrangement, and rotating handles 14 are provided on both sides of the charcoal doors 12; the grill main body 4 is provided inside with a barbecue grid 15 with a charcoal tray 16 at the bottom of the barbecue grid 15, and the charcoal tray 16 is matched with the rotating handle 14; the top cover 9 is provided with a U-shaped handle 17, a thermometer 18 is provided on the top of the U-shaped handle 17, and the side of the grill main body 4 is provided with air vents 19.

Further, there are two charcoal doors 12 with the axisymmetric arrangement, and the symmetrically provided charcoal doors allow for adding charcoal on the one side according to actual usage requirement.

Further, the side tables 8 are connected to the supporting frame 1 with a slider 20, and the slider 20 is provided with a fixation hook 21; the top of the supporting frame 1 is provided with a fixed axis 22, and the fixation hook 21 is connected in conjunction with the fixed axis 22. The above structure allows the side tables and supporting frame to be placed in close proximity when not in use, to reduce the space occupation.

Further, the side tables 8 are provided with square steel tubes on both sides and multiple sheet plates on the top, with sheet plates and the square steel tubes perpendicular to each other. The sheet plates are in the shape of rectangular, to improve the storage area.

Further, the warming rack 23 is provided between the top cover 9 and the grill main body 4. The warming rack 23 is designed as the foldable barbecue grid, the Z-shaped structure with hinge joint can achieve the full expansion when opening the top cover.

The working principle of the invention is as follows: By adding a top cover to the top of the grill, the heat inside the grill can be concentrated to form a hot air circulation, and the smoke from the grill can be concentrated to flow out from the chimney. A thermometer is provided on the top cover to enable real-time monitoring of the grilling temperature. The grill main body is provided with adjustable air vents, and the grilled food can be placed on the warming rack for preservation and placement. The air vents are provided in a circular arrangement with four of octant circles, allowing for airflow control through adjustment. The side with supporting legs can be lifted to move the grill, which can be used as an outdoor grill. The rotating handle on both sides of the grill is connected to the gear on the rotating shaft, and the bottom of the charcoal tray is provided with a lifting mechanism connected to the handles to realize the height adjustment of the charcoal tray for adjusting the temperature of the food when grilling. Two doors for adding charcoal can realize the heating of half of the grill main body to save charcoal and the controlling of charcoal addition according to the actual requirements, to achieve the temperature control of the sub-district, with wide application, easy operation, and excellent market prospect.

Although embodiments of the invention have been shown and described, it will be understood by those of ordinary skill in the art that a variety of variations, modifications, replacements and variants of these embodiments can be made without departing from the principles and spirit of the invention. Therefore, the protection scope of the invention should be subject to the protection scope defined by the claims and equivalents thereof.

What is claimed is:

1. A multi-functional grill comprising a supporting frame (1), wherein the supporting frame (1) is provided with stiffeners (2) at a bottom, and a wire mesh storage (3) is provided between the stiffeners (2); the supporting frame (1) is provided with a grill main body (4) at a top, and the grill main body (4) is provided with an ashtray (5); the grill main body (4) is provided with supporting legs (6) on a bottom of one side of the supporting frame (1) and wheels (7) on an other side; the supporting frame (1) is provided with side tables (8) on a top, and the side tables (8) are provided on both sides of the grill main body (4); a top of the grill main body (4) is hinged with a top cover (9), and the top cover (9) is provided with a chimney (10); a top of the chimney (10) is hinged with a rotating cap (11), a side of the grill main body (4) is hinged with charcoal doors (12), and the charcoal doors (12) are provided with handles (13); there are two charcoal doors (12) with an axisymmetric arrangement, and rotating handles (14) are provided on both sides of the charcoal doors (12); the grill main body (4) is provided inside with a barbecue grid (15) with a charcoal tray (16) at a bottom of the barbecue grid (15), and the charcoal tray (16) is matched with the rotating handle (14); the top cover (9) is provided with a U-shaped handle (17), a thermometer (18) is provided on the top of the U-shaped handle (17), and the side of the grill main body (4) is provided with air vents (19);

wherein the side tables (8) are connected to the supporting frame (1) with a slider (20), and the slider (20) is provided with a fixation hook (21); a top of the supporting frame (1) is provided with a fixed axis (22), and the fixation hook (21) is connected in conjunction with the fixed axis (22);

a warming rack (23) is provided between the top cover (9) and the grill main body (4).

2. A multi-functional grill according to claim 1, wherein there are two charcoal doors (12) with the axisymmetric arrangement.

3. A multi-functional grill according to claim 1, wherein the side tables (8) are provided with square steel tubes on both sides and multiple sheet plates on a top, with sheet plates and the square steel tubes perpendicular to each other.

\* \* \* \* \*